(12) United States Patent
Baudouin et al.

(10) Patent No.: US 9,582,849 B2
(45) Date of Patent: Feb. 28, 2017

(54) METHOD AND SYSTEM TO VIRTUALIZE GRAPHIC PROCESSING SERVICES

(71) Applicant: VMware, Inc., Palo Alto, CA (US)

(72) Inventors: Sébastien Baudouin, Grenoble (FR); Cyprien Laplace, Grenoble (FR); Damien Dejean, Grenoble (FR); Eric Donnat, Grenoble (FR)

(73) Assignee: VMware, Inc., Palo Alto, CA (US)

( * ) Notice: Subject to any disclaimer, the term of this patent is extended or adjusted under 35 U.S.C. 154(b) by 590 days.

(21) Appl. No.: 14/065,309

(22) Filed: Oct. 28, 2013

(65) Prior Publication Data

US 2015/0116310 A1    Apr. 30, 2015

(51) Int. Cl.
*G06T 15/00*   (2011.01)
*G06T 1/60*    (2006.01)
(Continued)

(52) U.S. Cl.
CPC ............ *G06T 1/60* (2013.01); *G06F 9/45533* (2013.01); *G06F 9/3851* (2013.01); *G06F 9/45508* (2013.01); *G06T 1/00* (2013.01); *G06T 1/20* (2013.01); *G06T 15/00* (2013.01); *G06T 15/005* (2013.01); *G06T 15/04* (2013.01); *G06T 15/10* (2013.01); *G06T 17/00* (2013.01); *G06T 17/20* (2013.01); *G09G 5/363* (2013.01)

(58) Field of Classification Search
CPC ......... G06T 19/00; G06T 17/20; G06T 17/00; G06T 15/10; G06T 15/00; G06T 15/005; G06T 1/20; G06T 15/04; G09G 5/363; G06F 9/3851
See application file for complete search history.

(56) References Cited

U.S. PATENT DOCUMENTS

| | | | |
|---|---|---|---|
| 6,336,173 B1 * | 1/2002 | Day, III ................ | G06F 3/0614 707/999.201 |
| 6,434,620 B1 * | 8/2002 | Boucher ............. | H04L 12/5693 709/230 |

(Continued)

OTHER PUBLICATIONS

"Using the Emulator", <Retrieved from the Internet at URL: http://developer.android.com/tools/devices/emulator.html>, printed on Oct. 28, 2013.

*Primary Examiner* — Abderrahim Merouan

(57) ABSTRACT

Methods and systems configured to virtualize graphic processing services in a virtual machine environment are disclosed. A virtual machine monitor (VMM) may be configured to maintain a virtual machine (VM) based on a host operating system (OS) executing in the system. The VM may contain a virtualized graphics library (vGLib) configured to support a graphic command from an application executing in the VM. The host OS may contain a graphics library (GLib) configured to support the graphic command and utilize a graphics processing unit (GPU) in the system to process the graphic command. Upon receiving the graphic command from the application, the vGLib may be configured to allocate a memory section in the VM to store the graphic command. And the VMM may be further configured to share access to the memory section with the host OS, thereby allowing the host OS to retrieve the graphic command from the memory section and deliver the graphic command to the GLib for processing.

18 Claims, 4 Drawing Sheets

(51) Int. Cl.

| | | |
|---|---|---|
| G06T 1/00 | (2006.01) | |
| G06T 15/04 | (2011.01) | |
| G09G 5/36 | (2006.01) | |
| G06T 1/20 | (2006.01) | |
| G06F 9/38 | (2006.01) | |
| G06T 15/10 | (2011.01) | |
| G06T 17/20 | (2006.01) | |
| G06T 17/00 | (2006.01) | |
| G06F 9/455 | (2006.01) | |

(56) References Cited

U.S. PATENT DOCUMENTS

| | | | | |
|---|---|---|---|---|
| 7,971,006 B2 * | 6/2011 | Justiss | ............... | G06F 3/0605 711/156 |
| 8,274,518 B2 * | 9/2012 | Blythe | ............... | G06F 9/45537 345/522 |
| 8,402,462 B2 * | 3/2013 | Ciano | ............... | G06F 9/4862 718/1 |
| 8,886,872 B1 * | 11/2014 | Norrie | ............... | G06F 17/30327 710/38 |
| 9,141,628 B1 * | 9/2015 | Zimmermann | ... | G06F 17/30106 |
| 2002/0156927 A1 * | 10/2002 | Boucher | ............... | H04L 29/06 709/250 |
| 2003/0064801 A1 * | 4/2003 | Breckner | ............... | G07F 17/323 463/30 |
| 2008/0303833 A1 * | 12/2008 | Swift | ............... | G06T 15/005 345/505 |
| 2009/0119665 A1 * | 5/2009 | Venkitachalam | ....... | G06F 11/14 718/1 |
| 2010/0191911 A1 * | 7/2010 | Heddes | ............... | G06F 15/16 711/118 |
| 2011/0022694 A1 * | 1/2011 | Dalal | ............... | H04L 41/0843 709/222 |
| 2011/0320682 A1 * | 12/2011 | McDougall | ........... | G06F 12/023 711/6 |
| 2012/0154389 A1 * | 6/2012 | Bohan | ............... | G06F 9/5072 345/419 |
| 2013/0155083 A1 * | 6/2013 | McKenzie | ............... | G06T 1/20 345/522 |
| 2013/0210522 A1 * | 8/2013 | Dharmapurikar | ..... | G06F 15/005 463/31 |
| 2013/0312096 A1 * | 11/2013 | Larsen | ............... | G06F 9/45558 726/24 |
| 2014/0089626 A1 * | 3/2014 | Schluessler | ......... | G06F 9/45558 711/170 |

* cited by examiner

METHOD AND SYSTEM TO VIRTUALIZE GRAPHIC PROCESSING SERVICES

BACKGROUND

OpenGL ES (Open Graphics Language for Embedded System) is a cross-platform API for rendering 2D and 3D graphics on an embedded system. For a system that is equipped with an OpenGL ES compatible graphics processing unit (GPU), a graphic application may take advantage of the GPU acceleration by using OpenGL ES commands to perform its graphic tasks. For a system that does not have a GPU, the graphic application may be forced to utilize the central processing unit (CPU) to process these OpenGL ES commands. As a result, the performance of a graphic application in a system that contains a GPU is generally faster than in a system that does not contain a GPU. In addition, OpenGL ES 2.0 standard may require mandatory GPU support. Thus, a graphic application that is programmed based on the OpenGL ES 2.0 standard may not be executable in an embedded system that does not have a GPU.

A virtual machine (VM) may be configured to simulate an embedded system that supports an OpenGL ES application. An OpenGL ES application executing in the VM may issue OpenGL ES commands to the VM. However, the VM, which is a software emulating a physical machine, may not have a direct access to a GPU. In this case, the VM may provide OpenGL ES supports based on software implementations. Still, the software-implemented OpenGL ES supports may require a lot of CPU throughputs, which may slow down the application's performance in the VM significantly. Alternatively, the VM may be implemented with a virtualized GPU, or have a virtualized GPU driver which can interface with a physical GPU. However, these solutions may not be flexible as the VM may have to support different GPUs for different embedded systems.

SUMMARY

Methods and systems configured to virtualize graphic processing services in a virtual machine environment are disclosed. A virtual machine monitor (VMM) may be configured to maintain a virtual machine (VM) based on a host operating system (OS) executing in the system. The VM may contain a virtualized graphics library (vGLib) configured to support a graphic command from an application executing in the VM. The host OS may contain a graphics library (GLib) configured to support the graphic command and utilize a graphics processing unit (GPU) in the system to process the graphic command. Upon receiving the graphic command from the application, the vGLib may be configured to allocate a memory section in the VM to store the graphic command. And the VMM may be further configured to share access to the memory section with the host OS, thereby allowing the host OS to retrieve the graphic command from the memory section and deliver the graphic command to the Glib for processing.

DETAILED DESCRIPTION

Figure 1:
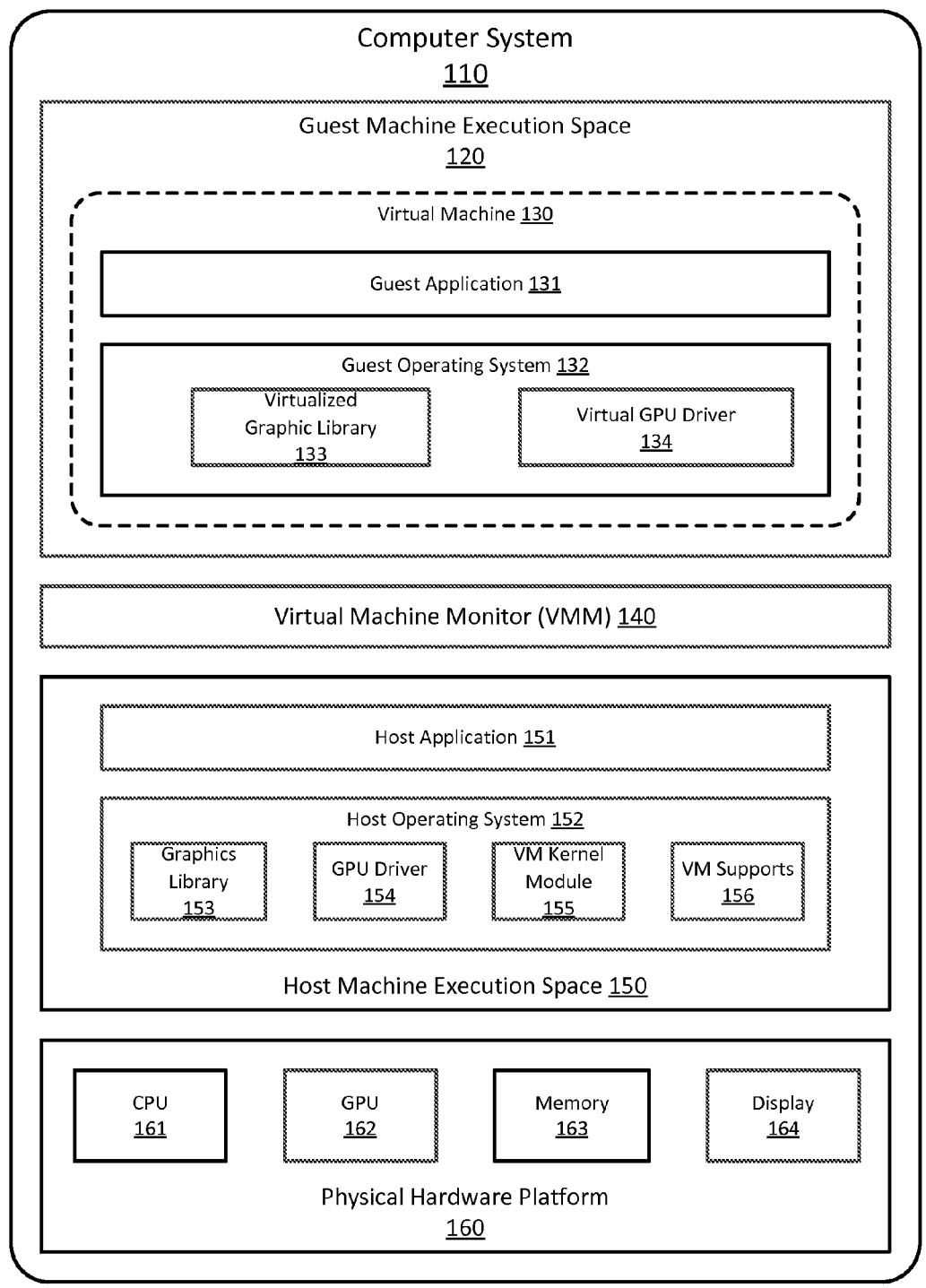
FIG. 1 illustrates a block diagram of a virtualized computer environment that provides GPU acceleration to graphic applications, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a virtualized computer environment that provides GPU acceleration to graphic applications, according to one or more embodiments of the present disclosure. In FIG. 1, a computer system 110, which may be a mobile device, smartphone, desktop, laptop, or server-grade computer, may be constructed based on a physical hardware platform 160 (e.g., a mobile device architecture platform). The physical hardware platform 160 may be configured with, without limitation, a CPU (central processing unit) 161, a GPU (graphics processing unit) 162, memory 163, and/or a display device 164. The hardware platform 160 may be configured with additional components not shown in FIG. 1.

In one embodiment, the CPU 161 may be a general-purpose processor configured to perform basic arithmetical, logical, and input/output operations for the computer system 110. The GPU 162 may be a specialized processor configured to accelerate the creation and processing of graphic images intended for output to the display device 164. The GPU 162 may be configured to render graphic images regardless whether the computer system 110 contains a display device 164 or not. The GPU 162 may also be configured to utilize one or more "frame buffers" (which may be memory storages provided by the physical memory 163) to store or retrieve image frames. Compared to the CPU 161, the GPU 162 may be more efficient in manipulating large quantity of graphics data and performing parallel-processing.

In one embodiment, a host machine execution space 150 may be implemented based on the physical hardware platform 160. The host machine execution space 150 may include, without limitation, a host operating system (OS) 152 and one or more host applications 151. In other words, the host OS 152 may be installed on the top of the physical hardware platform 160, and the host applications 151 may be executing in the host OS 152. The host OS 152 may be a desktop operating system such as, without limitation, WINDOWS®, Apple OS®, Linux®, Solaris® x86, NetWare®, FreeBSD®. The host OS 152 may also be a mobile operating system such as, without limitation, Android®, iOS®, Blackberry OS®, WINDOWS PHONE®. For example, when the computer system 110 is a mobile smartphone, the host OS 152 may be a mobile OS installed in the mobile smartphone, and the host application 151 may be a mobile application designed for executing in the mobile OS.

In one embodiment, a virtualization machine monitor (VMM) 140, or a hypervisor, may be implemented based on the host machine execution space 150. The VMM 140 may be configured to support a guest machine execution space 120 within which one or more virtual machines may be concurrently instantiated and executed. In other words, the VMM 140 may support multiple virtual machines each of which may be installed with a common or different instance of operating system. A "virtual machine" (VM) may be an abstraction (or a virtualization) of an actual physical computer system. As shown in FIG. 1, the VMM 140 may create a VM 130 in the guest machine execution space 120, and install an operating system (OS) 132 in the VM 130 to execute and support one or more applications 131. In one embodiment, the host OS 152 and the guest OS 132 may be Android OS®. In this configuration, the host OS 152 may provide a personal environment for personalized applications 151, while the guest OS 132 may be configured as a corporate environment capable of secure management of the guest applications 131.

In one embodiment, the VM 130, which may be referred to as a "guest", "guest machine", or "guest system", may rely on the hardware and software supports provided by the physical hardware platform 160 as well as the OS 152. Thus, throughout the present disclosure, the physical hardware platform 160 and/or the OS 152 may be referred to as the "host", "host machine", or "host system." For example, the machine execution space 120 the VM 130 resides may be referred to as the "guest machine execution space", the OS 132 as the "guest OS", and the application 131 as the "guest application", accordingly. Likewise, the machine execution space 150 may be referred to as the "host machine execution space", the OS 152 as the "host OS", and the application 151 as the "host application", accordingly.

It should be recognized that the various terms, layers and categorizations used to describe the virtualization components in FIG. 1 may be referred to differently without departing from their functionalities or the spirit and scope of the present disclosure. For example, the VMM 140 may be designed as a part of the host machine execution space 150. In this case, the VMM 140 may be a specific type of application 151 executing in the host OS 152. Alternatively, the VMM 140 may be deemed as a part of the guest machine execution space 120. The details of the VMM 140 are further described below.

In one embodiment, the host OS 152 may be configured with a graphics library (GLib) 153, a GPU driver 154, a virtual machine (VM) kernel module 155, and VM support services 156. The GPU driver 154 may be a device driver (or device interface) that serves as an interface to the GPU 162. The GLib153 may be a programming library with optimized functions that can perform graphic rendering operations. Specifically, the GLib153 may be configured to utilize the GPU driver 154 to take advantage of the hardware acceleration capabilities of the GPU 162. For example, the GLib 153 may support OpenGL® (Open Graphics Library), which is a cross-language multi-platform application programming interface (API) for rendering 2D and 3D graphic images. The GLib 153 may also support OpenGL ES (Open GL Embedded System), DirectX®, or other computer graphics programming standards. Thus, a host application 151 may utilize an OpenGL compatible graphic command to interface with the GLib 153.

In one embodiment, the VM kernel module 155 may be a module installed in the kernel of the host OS 152. The VM support services 156 may contain interfaces that allow the VMM 140 to interact with the VM kernel module 155. In other words, the VM kernel module 155 may be deemed a kernel extension of the VMM 140, and the VM support services 156 may be deemed an extension of the VMM 140 that belongs to the "host machine execution space" 150. The VM kernel module 155 may be configured to support multiple VMM 140s, each supporting a specific guest machine execution space 120. The VM support services 156 may be configured to provide a communication link between the guest OS 132 and the host machine execution space 150. Further, the VM support services 156 may contain a render manager configured to manage the rendering operations in the host machine execution space 150. The VM support services 156 may also be configured to invoke the GLib 153.

In one embodiment, the guest OS 132 may be configured with a virtualized graphics library (vGLib) 133 and a virtual GPU driver 134. The vGLib 133 may be a virtualized version of the GLib 153, meaning that a graphic command that is supported by the GLib 153 may also be supported by the vGLib 133. The virtual GPU driver 134 may be configured to provide virtualized GPU supports to the vGLib 133. In one embodiment, the vGLib 133 may serve as an interface to the GLib 153. Specifically, the vGLib 133 may transmit a GPU-related graphic command originated from the graphic application 131 or the guest OS 132 to the virtual GPU driver 134, which may simulate a device driver that interfaces with a GPU and forward the GPU-related graphic command to the GLib 153. The vGLib 133 may also contain functions to manage "graphic contexts" associated with the guest application 131. However, the vGLib 133 may not contain some of the graphic processing functions, and may not be able to directly interface with the GPU 162. In other words, the vGLib 133 itself does not contain some or all of the functionalities of the GLib 153 with respect to graphic processing, and may not interface with the GPU 162 without the GLib 153. Optionally, the vGLib 133 may support extended commands that are not supported by the GLib 153. In this case, the vGLib 133 may implement the functionalities that are associated with the extended commands.

In one embodiment, a single guest application 131 may be deployed to multiple computer systems that have different GPU 162s. These computer systems may contain respective GPU drivers 154 and GLib 153s that support the different GPU 162s. However, these GLib 153s may provide standardized APIs which are compatible with the interfaces provided by the vGLib 133. As a result, when a VM 130 with a vGLib 133 is deployed to each of these computer systems, the vGLib 133 may be able to directly interface with the GLib 153s in these computer systems, regardless of the type of GPU 162s these computer systems have. Thus, a common guest application 131 in the VM 130 may be able to utilize the different GPU 162s via the vGLib 133, even when the VM 130 does not provide a virtualized GPU. The details of the vGLib 133 and the GLib 153 are further described below.

In one example, the guest application 131 may be a graphic application configured to generate a graphic image displayable on the display device 164. To accomplish this, the guest application 131 may issue one or more OpenGL ES compatible graphic commands to the vGLib 133 for the drawing and manipulating of the graphic image. Upon receiving the one or more OpenGL ES graphic commands, the vGLib 133 may deliver the graphic command(s) to the GLib 153, which is configured to utilize the GPU 162 for hardware acceleration. In one embodiment, the VMM 140 may facilitate the delivery of the graphic command(s) by conducting TCP/IP like communications between the guest OS 132 and the host OS 152. Alternatively, the VMM 140 may utilize shared memory for the delivery of the graphic command(s) and graphic data, in order to limit the number of data copying. Further, the vGLib 133 and the VMM 140 may reduce the amount of frame buffer usages in the guest OS 132, in order to improve the performance of the vGLib 133 in the guest OS 132. The details of these improvements are further described below.

Figure 2:
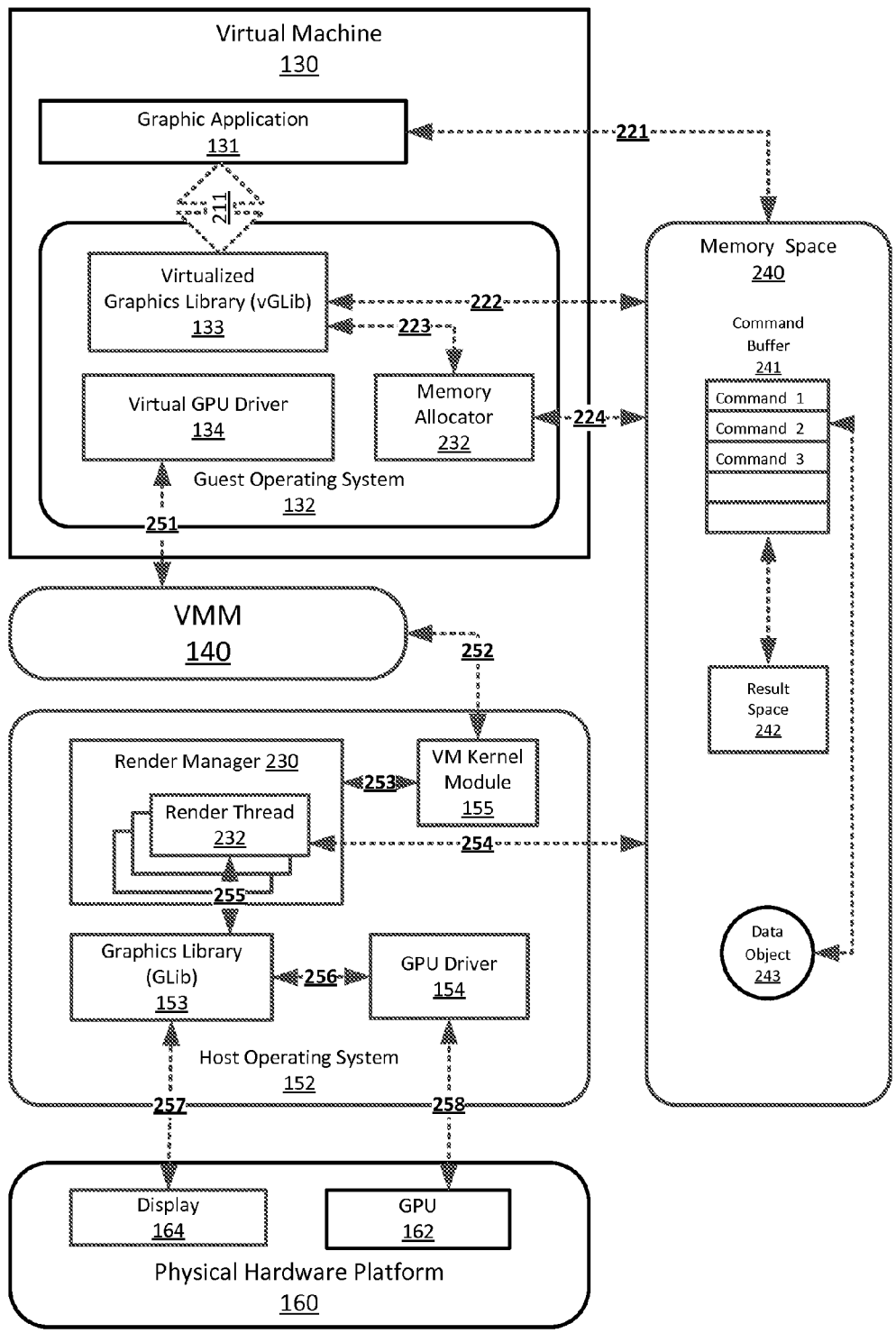
FIG. 2 illustrates a block diagram of a virtualized machine environment configured with a virtualized graphics library, according to one or more embodiments of the present disclosure.

FIG. 2 illustrates a block diagram of a virtualized machine environment configured with a virtualized graphics library, according to one or more embodiments of the present disclosure. In FIG. 2, various components and modules (including, without limitation, the VM 130 with its guest OS 132, the VMM 140, the host OS 152, as well as the physical hardware platform 160) correspond to their respective counterparts in FIG. 1. Further, the virtualized graphics library (vGLib) 133, the virtual GPU driver 134, the VM kernel module 155, the graphics library (GLib) 153, the GPU driver 154, the GPU 162, and/or the display device 164 also correspond to their respective counter parts in FIG. 1. Additional components and modules that are shown in FIG. 1 may be omitted in FIG. 2 for simplicity purposes. In FIG. 2, the guest OS 132 may be configured with a memory allocator 232, and the host OS 152 may be configured with a render manager 230. Further, the guest OS 132, the VMM 140, and the host OS 152 may utilize storages in the memory space 240 for data transmission.

In one embodiment, a graphic application 131, which may be similar to the guest application 131 of FIG. 1, may transmit (211) a graphic command to the vGLib 133. The "graphic command" may be an instruction to perform a specific graphic operation associated with a graphic image. The graphic command may also contain parameters and/or image data associated with the graphic image. The graphic command may be compatible with a graphics library standard, and may be designed to take advantage of the GPU 162's processing capability. For example, the graphic command may be an OpenGL ES command to draw a graphic shape on the display device 164. If the vGLib 133 cannot fully process the OpenGL ES command, it may forward the OpenGL ES graphic command to the GLib 153 for further processing.

In one embodiment, the vGLib 133 may utilize the VMM 140 to forward the graphic command to the GLib 153. In one approach, the vGLib 133 may first send the graphic command to the VMM 140, which may then deliver the graphic command to the host OS 152 using a network communication mechanism (e.g., TCP/IP). Such an approach may require the transmitting of a copy of the graphic command and/or the image data associated with the graphic command from the guest OS 132 to the host OS 152. Therefore, when the image data (e.g., texture image) associated with the graphic command is large, making a copy of the image data, plus the transmitting of the copy of the image data through the various modules in the VM 130, VMM 140 and host OS 152, may take a lot of system time and resources. In another approach, the VMM 140 may utilize a shared-memory mechanism to implement communications between the guest OS 132 and the host OS 152. Specifically, VMM 140 may share a section of the memory used by the guest OS 132 with the host OS 152, so the vGLib 133 may store the graphic command and its associated parameters to, and the host OS 152 may retrieve the graphic command and its parameters from, the shared memory section. The VMM 140 may also utilize the shared memory section for exchanging large image data between the guest OS 132 and the host OS 152.

In one embodiment, the vGLib 133 may instruct (223) a memory allocator 232 to allocate (224) a section of memory in the memory space 240, in order to store (222) graphic commands and/or image data in the allocated section of memory. The memory space 240 may be based on the physical memory in the computer system (e.g., computer system 110 of FIG. 1). In the guest OS 132, with the proper authorizations and privileges, the graphic application 131 and/or the vGLib 133 may access the allocated section of the memory utilizing a "guest memory address." Afterward, the VMM 140 may instruct (252) the VM kernel module 155 to map the section of memory for the host OS 152. "Mapping" the section of memory allows the host OS 152 to have access to the same section of memory in the host OS 152 using a "host memory address" (different from the guest memory address). After the host OS 152 finished accessing the section of memory, the VMM 140 may instruct (252) the VM kernel module 155 to "un-map" the section of memory, thereby removing the host OS 152's access to the section of memory. Thus, the guest OS 132 and the host OS 152 may utilize the memory space 240 to share/transmit information.

In one embodiment, via the memory allocator 232, the vGLib 133 may allocate a command buffer 241 in the memory space 240 for storing graphic commands associated with a corresponding graphic context. For a specific graphic application 131 that utilizes the vGLib 133, the vGLib 133 may construct a corresponding "graphic context" in the guest OS 132 to manage the graphic data and states associated with the specific graphic application 131 in the guest OS 132. The "graphic context" may be deemed a resource management container that stores data and states associated with the rendering and displaying of graphic data by the graphic application 131. For example, the graphic context may be an "OpenGL ES Context", which may further contain references to buffers, textures, shaders, and other data structures. When there are multiple graphic applications 131 executing in the guest OS 132, the vGLib 133 may maintain, for each of the graphic applications 131, a corresponding instance of graphic context. Further, when the vGLib 133 forwards the graphic commands from a specific graphic application 131 to the GLib 153, the GLib 153 may construct a corresponding "graphic context" in the host OS 152 for the processing of the graphic commands of the specific graphic application 131.

In one embodiment, the vGLib 133 may utilize the memory allocator 232 to allocate (222) a specific command buffer 241 for each graphic context it maintains. When multiple threads of a graphic application 131 share a common graphic context, then the vGLib 133 may allocate a single command buffer 241 shared by the multiple threads for storing their graphic commands. On the other hand, when each of the multiple threads of the graphic application 131 maintains its own copy of graphic context, then the vGLib 133 may allocate a specific command buffer 241 for each graphic context corresponding to a specific thread of the graphic application 131. Further, each command buffer 241 may have a configurable size (which may be increased on demand) for storing a specific number of graphic commands. After a preconfigured period of time, or once the command buffer 241 becomes full, the vGLib 133 may inform the virtual GPU driver 134 that the command buffer 241 is available for access by the host OS 152.

In one embodiment, the vGLib 133 may utilize the virtual GPU driver 134, the VMM 140, a render manager 230 in the host OS 152, and a VM kernel module 155 in the host OS 152 to facilitate the sharing of the data in the memory space 240 and/or the transmitting of data using the memory space 240. Specifically, the vGLib 133 may invoke the virtual GPU driver 134 to start the above memory sharing and data transmission process. The virtual GPU driver 134 may be a stream virtualized driver (a module installed in the kernel of the guest OS 132) configured to communicate with the VMM 140. Upon receiving an invocation from the vGLib 133, the virtual GPU driver 134 may make a hyper-call (251) to the VMM 140. The hyper-call may request for the sharing of the command buffer 241 and the notifying of the host OS 152 for processing the graphic commands in the command buffer 241.

In one embodiment, once received the hyper-call (252) from the virtual GPU driver 134, the VMM 140 may utilize the VM kernel module 155 in the host OS 152 to perform a mapping of the memory space 240 for the host OS 152. During the mapping process, the VM kernel module 155 may generate, for the host OS 152, a memory pointer that can be used to locate the command buffer 241 in the memory space 240. After the mapping process, the host OS 152, as well as the host applications executing in the host OS 152, may access the command buffer 241 using the memory pointer. Based on the hyper-call, the VMM 140 may utilize the VM kernel module 155 to generate and transmit (253) an event (which may include the mapped memory pointer) to the render manager 230 in the host OS 152, informing the availability of the command buffer 241 for processing.

In one embodiment, the render manager 230 may be a host application (similar to the host application 151 of FIG. 1) executing based on the host OS 152. The render manager 230 may act as a daemon continuously listening to various events transmitted from the VMM 140. The VMM 140 may first deliver (252) the event to the VM kernel module 155. Afterward, the VM kernel module 155 may "push" the event to the render manager 230, or the render manager 230 may "pull" the event from the VM kernel module 155. Upon receiving a specific event, the render manager 230 may instantiate (or activate) a render thread 232 to handle the event. In one embodiment, the render manager 230 may assign a specific render thread 232 to process a specific command buffer 241. In this case, each render thread 232 may manage a specific "graphic context" associated with the specific command buffer 241.

In one embodiment, a "render thread" may be a process, or a thread of a process, dedicated to retrieve (254) graphic commands from the command buffer 241 and interface with the GLib 153 on behalf of the graphic application 131. In other words, the render thread 232 may extract one graphic command from the command buffer 241, transmit the graphic command originated from the graphic application 131 to the GLib 153, and optionally receive, for the graphic application 131, a graphic result from the processing of the graphic command by the GLib 153. Further, the render thread 232 may maintain a dedicated operating environment (e.g., a graphic context) in its memory space for the graphic application 131, in order to keep track of the various states of the graphic objects or store temporary variables associated with the graphic command.

In one embodiment, upon receiving the event, the render thread 232 may process the event by extracting a memory pointer from the event. The render thread 232 may then utilize the memory pointer to locate the command buffer 241 in the memory space 240. For each graphic command extracted from the command buffer 241, the render thread 232 may optionally retrieve from the memory space 240 the parameters and image data that are associated with the graphic command. Afterward, the render thread 232 may invoke (255) a specific API in the GLib 153 that is associated with the graphic command, and pass the parameters and image data associated with the graphic command to the API. For a graphic command that can take advantage of the GPU 162, the GLib 153 may utilize (256) the GPU driver 154 to interact (258) with the GPU 162. The GPU 162 may perform graphical manipulations based on the graphic command, and return graphic result from the graphical manipulations to the GLib 153 via the GPU driver 154. For another graphic command that requires displaying a graphic image, the GLib 153 may perform its underlying mechanisms to show (257) the graphic image in the display device 164.

In one embodiment, the graphic application 131 may issue a graphic command requesting for a specific piece of information related to a graphic object. Subsequently, the graphic application 131 may continue its logics based on the specific piece of information. For example, the graphic command may be an OpenGL ES command seeking a transformed vertex's current position. Afterward, the graphic application may perform a subsequent operation to move the vertex to a new position. In this case, the vGLib 133 may store the graphic command in the command buffer 241, and, without waiting for the command buffer 241 to be full, utilize the above mechanism to inform the GLib 153 to process the graphic command. The GLib 153 may transmit the OpenGL ES command to the GPU 162, which in turn may calculate a current position and return the position as a graphic result to the GLib 153. Afterward, the GLib 153 may return the graphic result to the graphical application 131 using the memory-sharing mechanism as described above.

Specifically, the GLib 153 may deliver the graphic result as a response to the invocation 255 to the render thread 232. The render thread 232 may then locate a result space 242 in the memory space 240 that is associated with the command buffer 241, and store the received graphic result into the result space 242. Optionally, the render thread 232 may associate the graphic result stored to the result space 242 with the specific graphic command in the command buffer 241 the graphic result is generated from. Alternatively, each command buffer 241 may be associated with one result space 242 for storing graphic result associated with the graphic command that is currently being selected from the command buffer 241 for processing. After completed the processing of one graphic command, the render thread 232 may select a subsequent graphic command in the command buffer 241 for processing.

In one embodiment, the guest OS 132 may allocate the result space 242 in the memory space 240, similar to the allocating of the command buffer 241 in the memory space 240. Alternatively, the render thread 232 (or another module executing in the host OS 152) may be configured to allocate the result space 242 in the memory space 240, and inform the vGLib 133 (or the VMM 140) to map the address of the result space 242 for the guest OS 132. Afterward, the vGLib 133 may be able to access (222) the memory space 240 to retrieve the graphic result from the result space 242 that corresponds to the graphic command it previously stored in the command buffer 241. Further, the vGLib 133 may return the graphic result as a response (211) to the graphic application 131. Thus, throughout the above process, the VMM 140 does not need to transmit a copy of the graphic command (with its associated parameters and image data) to the host OS 152. Similarly, the host OS 152 does not need to copy the graphic result back to the guest OS 132. By using the memory-sharing mechanism, the performance of the data communications between the guest OS 132 and the host OS 152 may be greatly improved.

In one embodiment, the graphic application 131 may issue a graphic command that involves a large-sized graphic data. For example, the graphic command may be an OpenGL ES "glTextImage2D" command having a large 2D texture image as a parameter. In this case, the graphic application 131 may allocate and store (221) the large-sized graphic data as a data object 243 in the memory space 240. Similar to the process disclosed above, upon receiving this specific graphic command from the graphic application 131, the vGLib 133 may store the graphic command to the command buffer 241, and associate the data object 243 that is already allocated by the graphic application 131 in the memory space 240 with the graphic command. Afterward, the vGLib 133 may interact with the VMM 140 to trigger the sharing of the command buffer 241 (and the data object 243) with the host OS 152 and the processing of the graphic commands in the command buffer 241.

In one embodiment, similar to the memory-mapping process described above, the VM kernel module 155 may generate a first memory pointer for the command buffer 241, and a second memory pointer for the data object 243. The VM kernel module 155 may then create an event containing the first memory pointer and the second memory pointer, and deliver (253) the event to the render manager 230. Subsequently, the render manager 230 may assign a render thread 232 to process the event. The render thread 232 may utilize the first memory pointer to locate the command buffer 241, and the second memory pointer to locate the data object 243 in the memory space 240. Afterward, the render thread 232 may then invoke the corresponding API (e.g., "glTextImage2D") in the GLib 153 that is associated with the graphic command, and use the second memory pointer as a parameter for the API. The GLib 153 may access the data object 243 based on the second memory pointer, and perform hardware acceleration using the GPU 162. Thus, the vGLib 133 may deliver a large-sized graphic data to the GLib 153 without making or transmitting a copy of the large-sized graphic data for the host OS 152.

In one embodiment, since one command buffer 241 is associated with a single graphic context, and the single graphic context cannot be shared between multiple graphic applications 131, this command buffer 241 may not be shared among the multiple graphic applications 131 either. As a result, the order of the graphic commands in this command buffer 241 may represent the order the graphic application 131 issues these graphic commands. And the GLib 153 may sequentially process these graphic commands in this command buffer 241. When there are multiple graphic applications 131 executing in the guest OS 132, the render manager 230 may have multiple command buffers 241 to process. In this case, the render manager 230 may prioritize the processing of these command buffers 241 based on priority values.

In one embodiment, the guest OS 132 may assign different "priority values" to these multiple graphic applications 131. The vGLib 133 may generate a "guest priority value" for the graphic commands received from a specific graphic application 131, based on the graphic application 131's OS-assigned priority value. Afterward, the vGLib 133 may associate this "guest priority value" with the command buffer 241 that stores these graphic commands. Specifically, the vGLib 133 may generate and/or associate the "guest priority value" during the creation of the graphic context for the graphic application 131. Thus, where there are multiple graphic applications 131, the command buffers 241 in the memory space 240 may have corresponding "guest priority values."

In one embodiment, the render manager 230 may evaluate the "guest priority values" associated with the multiple command buffers 241, and convert these "guest priority values" to corresponding "host priority values." The render manager 230 may generate the host priority values by preserving the priority hierarchy presented in the guest priority values. Alternatively, the render thread 232 may generate the host priority values that represent the priority of the multiple graphic applications 131 from the host OS 152's perspective. Afterward, the render manager 230 may associate the host priority values to the command buffers 241, and assign render threads 232 to process those command buffers 241 that have high "host priority values" before assigning render threads 232 to process command buffers 241 that have low "host priority values."

In one embodiment, the virtual GPU driver 134, the VMM 140, and/or the VM kernel module 155 may implement and maintain a cache mechanism to further reduce the costs of mapping and de-mapping the shared-objects (e.g., command buffers 241, result space 242, data objects 243) in the memory space 240. Since mapping the shared-objects may have a non-negligible cost, to reduce these costs, the VMM 140 may cache the mapped shared-objects after the render manager 230 finished processing them. In this case, even when the guest OS 132 requests the VMM 140 to un-map these shared-objects, the VMM 140 may keep these shared-objects in the memory space 240 mapped for a specific period. Thus, in case the vGLib 133 requests the VMM 140 to re-map a specific shared-object that is previously mapped and unmapped, the VMM 140 may simply use the cached (remain mapped) shared-object, without request the VM kernel module 155 to perform additional memory mapping operations. If after the specific period, the VMM 140 does not receive additional request to map the shared-object, then the VMM 140 may instruct the VM kernel module 155 to un-map the shared-object for the host OS 152. Such an approach may improve the performance of the graphic application 131 when it performs certain operations (e.g., scrolling). In one embodiment, the virtual GPU driver 134 may also perform periodical cleanup of the command buffers 241, the result space 242, and/or the data objects 243 that are already allocated in the memory space 240.

Figure 3:
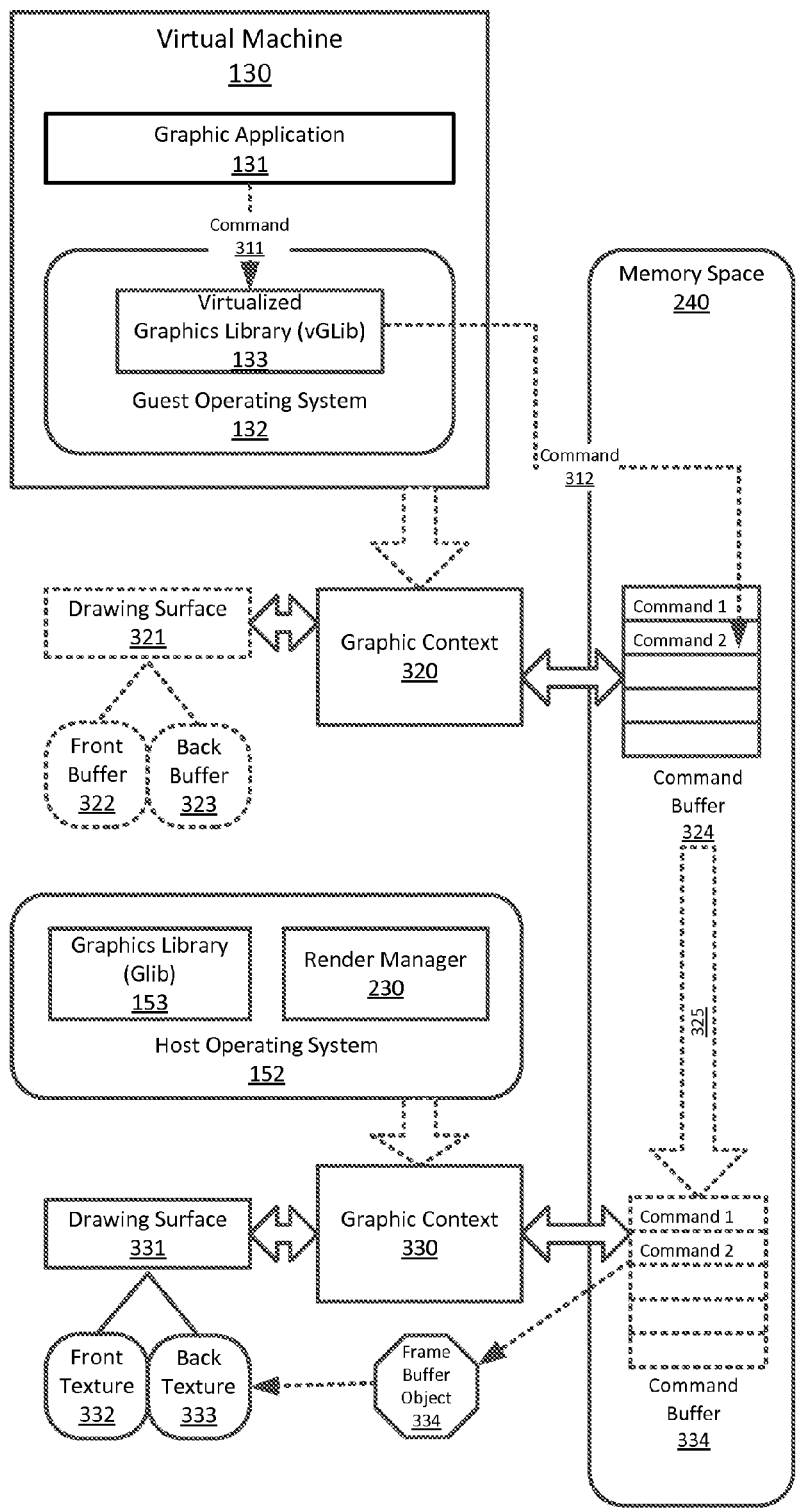
FIG. 3 illustrates a block diagram of a virtualized machine environment configured to improve the memory usage associated with the processing of a graphic command, according to one or more embodiments of the present disclosure.

FIG. 3 illustrates a block diagram of a virtualized machine environment configured to improve the memory usage associated with the processing of a graphic command, according to one or more embodiments of the present disclosure. In FIG. 3, various components and modules (including, without limitation, the VM 130 with its graphic application 131 and guest OS 132, the virtualized graphic library (vGLib) 133 in the guest OS 132, the memory space 240, and the guest OS 152 with its graphic library (GLib) 153 and render manager 230) correspond to their respective counterparts in FIG. 1 and FIG. 2. Additional components and modules that are shown in FIG. 1 and FIG. 2 may be omitted in FIG. 3 for simplicity purposes.

In one embodiment, the vGLib 133 may be configured to simulate the functionalities of the GLib 153, in order to fully support the graphic application 131 which is designed to interface with the GLib 153. For a host application (not shown in FIG. 3) executing in the host OS 152 and interacting with the GLib 153, the GLib 153 may construct a graphic context 330 to support the graphic rendering operations associated with the host application's graphic commands. Further, the GLib 153 may utilize a native platform graphics interface (e.g., EGL) to interact with the host OS 152's native window system. The native platform graphics interface may handle management of the graphics context 330, and provide mechanisms for creating a drawing surface 331. The "drawing surface" 331 may be a "window" or a "pixel map" on which the GLib 153 may draw or render graphic images, and may be tightly coupled with the host OS 152's native window system. In other words, the GLib 153 may construct a graphic context 330 and its associated drawing surface 331 for each host application that interacts with the GLib 153.

In one embodiment, the GLib 153 may associate the drawing surface 331 with a front buffer and a back buffer (not shown in FIG. 3) supplied by the host OS 152. The front buffer and the back buffer may also be referred to as the "OS-allocated buffers." Each of the front buffer and the back buffer may be deemed a "frame buffer" containing a set of pixels arranged in a two-dimensional array. The front buffer may be linked with a display device, meaning the pixels in the front buffer are currently being displayed on the display device. In the meantime, the GLib 153 may render another image, fill the back buffer with the rendered image, and swap the back buffer with the front buffer. Once the front buffer and the back buffer are swapped, the image in the back buffer may be displayed on the display device, and the GLib 153 may then utilize the front buffer for rendering a subsequent image.

In one embodiment, to be compatible with the GLib 153, the vGLib L 133 may similarly construct a graphic context 320 to support the graphic commands from the graphic application 131. The graphic context 320 may correspond to the graphic context 330, which is constructed by the GLib 153 to process these graphic commands of the graphic application 131 in the host OS 152. Further, as the GLib 153 may create a drawing surface 331 during the processing of these graphic commands, the vGLib 133 may create in the guest OS 132 a drawing surface 321 that corresponds to the drawing surface 331, in order to provide functionalities that are compatible with the GLib 153. In addition, similar to the GLib 153, the vGLib 133 may allocate a front buffer 322 and a back buffer 323, and associate the front buffer 322 and the back buffer 323 with the drawing surface 321. In other words, the vGLib 133 may manage the graphic context 320 and the drawing surface 321 in similar fashions as the GLib 153 managing the graphic context 330 and the drawing surface 331.

In one embodiment, after establishing the graphic context 320 and the drawing surface 321 for the graphic application 131, the vGLib 133 may associate the graphic context 320 with a command buffer 324 allocated to store graphic commands received from the graphic application 131. The vGLib 133 may then utilize the above-described memory-sharing mechanism to forward (325) the command buffer 324 to the host OS 152. For illustrative purpose, the command buffer 324 is shown as the command buffer 334 from the perspective of the host OS 152, even though these two command buffers 324 and 334 may in reality be a single copy of data in the memory space 240.

In one embodiment, the vGLib 133 may receive a graphic command 311 from the graphic application 131 to interact with the OS-allocated frame buffers (e.g., the front buffer 322 and the back buffer 323). For example, the graphic command 311 may instruct the vGLib 133 to display the image stored in the front buffer 322 or use the back buffer 323 to render a new image. The graphic command 311 may also request for the swapping of the front buffer 322 and the back buffer 323. To fully support this graphic command 311, the vGLib 133 may allocate, in the guest OS 132's memory space, the front buffer 322 and the back buffer 323. However, since the front buffer 322 and the back buffer 323 are not integrated with a physical display device, when the graphic command 311 is forwarded to the GLib 153, the GLib 153 may utilize the front buffer and the back buffer that are supported by the host OS 152 to perform the actual functions associated with the graphic command 311. As a result, the front buffer 322 and the back buffer 323 that are allocated in the guest OS 132 may be wasteful.

In one embodiment, for the graphic command 311 that involves OS-allocated frame buffers, the vGLib 133 may ignore the allocating of the front buffer 322 and the back buffer 323 in the guest OS 132. Instead, the vGLib 133 may update/adjust the graphic command 311 to utilize user-created frame buffers (e.g., frame buffer objects) in lieu of the OS-allocated frame buffers. For example, when the vGLib 133 detects that the graphic command 311 is associated with an OS-allocated frame buffer operation, the vGLib 133 may ignore the creation and the manipulation of the OS-allocated frame buffers. Such an approach may ensure that the front buffer 322 and the back buffer 323 are not unnecessarily allocated in the guest OS 132's memory space. For similar reasons, the vGLib 133 may also ignore the constructing of the drawing surface 321 in the guest OS 132.

In one embodiment, the vGLib 133 may alter the graphic command 311 to use user-created frame buffers, rather than the OS-allocated frame buffers. Specifically, the vGLib 133 may remove the referencing of the OS-allocated frame buffers in the graphic command 311, and generate additional graphic commands that manipulate user-created frame buffers instead. For example, the GLib 153 may utilize a "frame buffer object" as the user-created frame buffer. When the GLib 153 receives a graphic command to create and bind a new frame buffer object, the GLib 153 may allocate, in the host OS 152, a front texture 332 and a back texture 333 that are associated with the frame buffer object 334. Afterward, the GLib 153 may manipulate the frame buffer object 334 in a similar fashion as the manipulating of the OS-allocated frame buffers. In other words, the GLib 153 may direct the rendering outputs to the frame buffer object 334, which in turn may cause the rendering outputs to be stored in the back texture 333. Further, the GLib 153 may redirect the data stored in the back texture 333 to the OS-allocated back buffer by performing another rendering operation on the frame buffer object 334, thereby allowing the host OS 152 to display the image contained in the OS-allocated back buffer to a physical display device.

In one embodiment, the vGLib 133 may insert the additional graphic commands that utilize the user-created frame buffer either before and/or after the graphic command 131 in the command buffer 324. Once the command buffer 324 is shared with the host OS 324, the GLib 153 may process the additional graphic commands along with the graphic command 311, and construct an actual frame buffer object 334 in the host OS 152. The GLib 153 may then, allocate a front texture 332 and a back texture 333 in the host OS 152, and set the frame buffer object 334's rendering target to the back texture 333. Since the GLib 153 no longer uses the OS-allocated frame buffers in the host OS 152, there is no need for the vGLib 133 to maintain the corresponding front buffer 322 and back buffer 323 in the guest OS 132. As a result, the vGLib 133's memory usage may be reduced, and vGLib 133's overheads in allocating and de-allocating the front buffer 322 and the back buffer 323 may also be lowered.

In one embodiment, rather than altering the graphic command 311, the vGLib 133 may simply ignore the operations in the graphic command 311 that involve the creation and/or the manipulation of the OS-allocated frame buffers, and rely on the GLib 153 to implement the user-created frame buffers. In this case, the vGLib 133 may store the graphic command 311 to the command buffer 324 without creating any additional graphic commands. Upon receiving the graphic command 311, the GLib 153 may detect whether the graphic command 311 utilizes the OS-allocated frame buffers, and ignore these operations that involve the OS-allocated frame buffers. Afterward, the GLib 153 may perform additional operations that utilize the user-created frame buffers instead. Similar to the processes described above, the GLib 153 may construct a frame buffer object 334 for the graphic command 311, utilize the frame buffer object 334 to render outputs to the back texture 333, and redirecting the back texture 333 to the OS-allocated back buffer.

Figure 4:
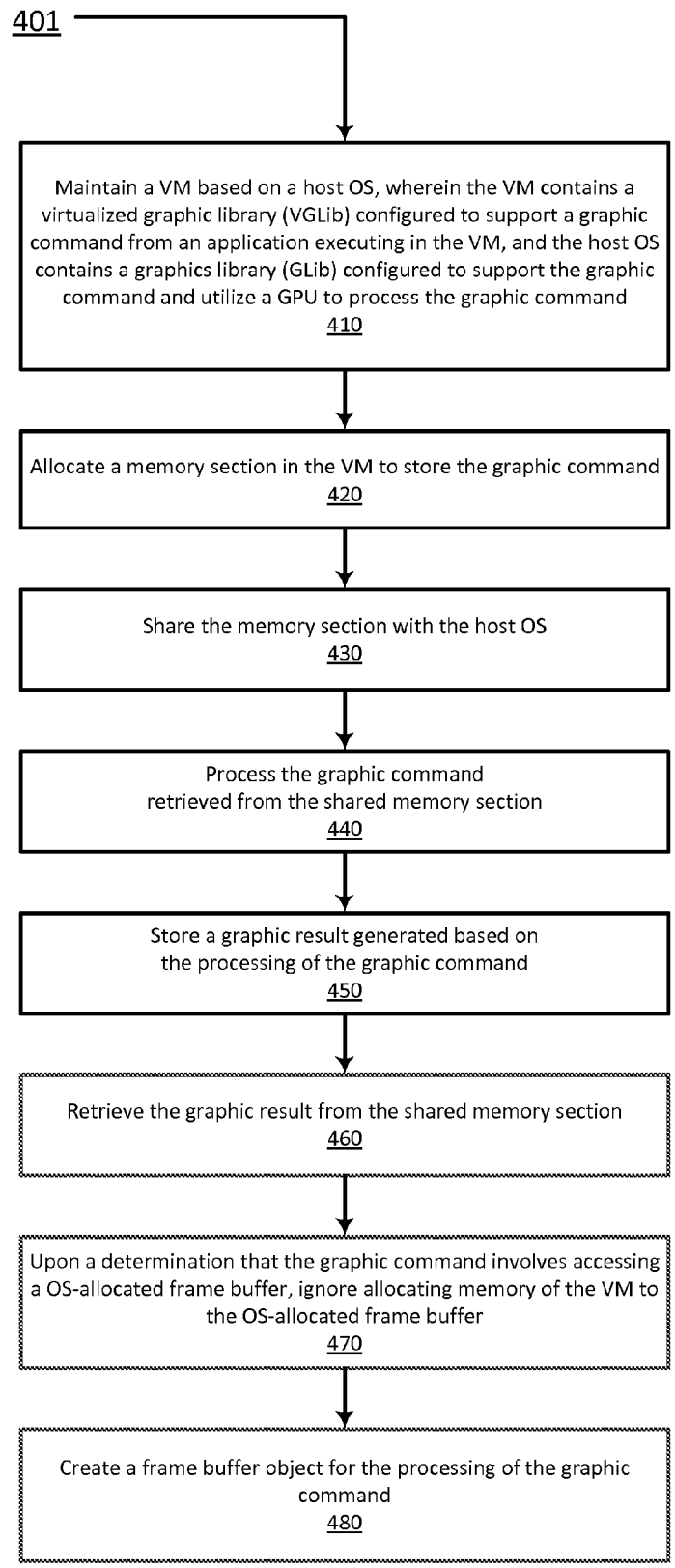
FIG. 4 shows a flow diagram illustrating a process to virtualize graphic processing services in a virtual machine environment, according to one or more embodiments of the present disclosure.

FIG. 4 shows a flow diagram illustrating a process to virtualize graphic processing services in a virtual machine environment, according to one or more embodiments of the present disclosure. The processes 401 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a virtual machine monitor (VMM) may be configured to maintain a virtual machine (VM) based on a host operating system (OS) executing in the system. The VM may contain a virtualized graphics library (vGLib) configured to support a graphic command from an application executing in the VM. The host OS may contain a graphics library (GLib) configured to support the graphic command and utilize a graphics processing unit (GPU) in the system to process the graphic command. In one embodiment, the vGLib is configured to support all graphic commands that are supported by the GLib. In another embodiment, the host OS may be an Android OS. The GLib may be an OpenGL ES compatible library. The vGLib may be a virtualized OpenGL ES compatible library. And the graphic command may be an OpenGL® compatible command.

At block 420, upon receiving the graphic command from the application, the vGLib may be configured to allocate a memory section in the VM to store the graphic command. Specifically, the vGLib may allocate a command buffer as the memory section to store the graphic command, without making a copy of the graphic command or transmitting the copy of the graphic command to the VMM. In one embodiment, the vGLib may store a plurality of graphic commands to the command buffer. The vGLib may also store parameters and image data associated with the graphic command in the memory section, along with the command buffer. Thus, the memory section may be a command buffer, and/or any parameters and image data associated with one or more graphic commands in the command buffer. Further, the vGLib may associate the command buffer with a corresponding priority value.

At block 430, the VMM may share access to the memory section with the host OS. Before the sharing, the host OS may not be allowed to access the memory action. After sharing, the host OS may be allowed to retrieve the graphic command from the command buffer in the memory section, and deliver the graphic command to the GLib for processing. In one embodiment, upon a determination that the command buffer is full, the VMM may generate a memory pointer configured to address the command buffer in the host OS. Afterward, the VMM may transmit an event with the memory pointer to the host OS. In one embodiment, the host OS may be configured with a render manager for listening to the event and retrieving the memory pointer upon receiving the event. Afterward, the render manager of the host OS may deliver the memory pointer to the GLib to access the command buffer and process the graphic command contained therein.

At block 440, the render manager of the host OS may be configured to retrieve the graphic command from the command buffer. The render manager may then invoke the GLib, which may process the graphic command using the GPU. In one embodiment, the render manager may also retrieve image data associated with the graphic command from the shared memory section, and pass the image data along with the graphic command to the GLib. In another embodiment, for multiple command buffers in the memory section that are associated with different priority values, the render manager may process the multiple command buffers based on their corresponding priority values.

At block 450, the GLib may generate a graphic result based on the processing of the graphic command using the GPU. Afterward, the render manager may store the graphic result in the memory section. At block 460, the vGLib may retrieve the graphic result from the memory section, and return the graphic result to the application as a response to the graphic command.

At block 470, upon a determination that the graphic command involves accessing an OS-allocated frame buffer (e.g., a front buffer or a back buffer) in the VM, the vGLib may ignore allocating memory of the VM to the OS-allocated frame buffer. In one embodiment, the GLib may also ignore the utilizing of the OS-allocated frame buffer in the host OS for processing the graphic command.

At block 480, upon receiving the graphic command, the GLib may create a frame buffer object for the processing of the graphic command, thereby allowing a GPU to draw using front/back texture which is associated with a guest OS' front/back buffer. Specifically, the GLib may utilize the frame buffer object as a rendering target to process the graphic command. In one embodiment, the GLib may first use the frame buffer object to allocate a color buffer having a back texture and a front texture in the host OS. The back texture may be associated with a back buffer in the host OS, and the front texture may be associated with a front buffer in the host OS. Afterward, the GLib may perform a rendering operation based on the frame buffer object, and direct output of the rendering operation to the back texture. Optionally, the GLib may swap the front texture with the back texture using the GPU, allowing the rendered output to be displayed via the front buffer to the physical display device.

Thus, systems and methods for virtualize graphic processing services in a virtual machine environment have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system configured to virtualize graphic processing services in a virtual machine environment, the system comprising a processor and memory coupled with the processor, wherein the memory is configured to provide the processor with instructions that cause the processor to execute stages comprising:

maintaining, by a virtual machine monitor (VMM), a virtual machine (VM) based on a host operating system (OS) executing in the system, wherein the VM contains a virtualized graphics library (vGLib) configured to support a graphic command from an application executing in the VM, and the host OS contains a graphics library (GLib) configured to support the graphic command and utilize a graphics processing unit (GPU) in the system to process the graphic command;

upon receiving the graphic command from the application, allocating, by the vGLib, a virtual command buffer as a memory section in the VM to store the graphic command, without transmitting the command to the VMM; and sharing, by the VMM, access to the virtual command buffer with the host OS, thereby allowing the host OS to retrieve the graphic command from the memory section and deliver the graphic command to the GLib for processing.

2. The system of claim 1, wherein the memory is further configured to provide the processor with instructions for:

retrieving, by the host OS, the graphic command from the shared memory section; and processing, by the GLib, the graphic command using the GPU.

3. The system of claim 2, wherein the memory is further configured to provide the processor with instructions for:
generating, by the GLib, a graphic result based on the processing of the graphic command using the GPU; and
storing, by the host OS, the graphic result in the shared memory section.

4. The system of claim 3, wherein the memory is further configured to provide the processor with instructions for:
retrieving, by the vGLib, the graphic result from the shared memory section; and
returning, by the vGLib, the graphic result to the application as a response to the graphic command.

5. The system of claim 1, wherein the memory is further configured to provide the processor with instructions for:
upon a determination that the graphic command involves accessing a front buffer or a back buffer, ignoring, by the vGLib, allocating memory of the VM to the front buffer or the back buffer; and
allocating, by the GLib, a frame buffer object for the processing of the graphic command by the Glib.

6. The system of claim 5, wherein the memory is further configured to provide the processor with instructions for:
utilizing, by the GLib, the frame buffer object as a rendering target to process the graphic command.

7. The system of claim 1, wherein the memory is further configured to provide the processor with instructions for:
storing, by the vGLib, a plurality of command buffers to the memory section, wherein each of the plurality of command buffers is associated with a corresponding priority value; and
processing, by the host OS, the plurality of command buffers retrieved from the memory section based on their corresponding priority values.

8. The system of claim 1, where the allocating the memory section in the VM comprises:
storing, by the vGLib, image data associated with the graphic command in the memory section; and
processing, by the host OS, the graphic command utilizing the image data retrieved from the memory section.

9. The system of claim 1, wherein the sharing the memory segment with the host OS comprises:
upon a determination that a command buffer in the shared memory section is full, generating, by the VMM, a memory pointer configured to address the command buffer in the host OS; and
transmitting, by the VMM, an event with the memory pointer to the host OS, wherein the host OS is configured to retrieve the memory pointer upon receiving the event.

10. The system of claim 9, where the sharing the memory section with the host OS further comprises:
utilizing, by the GLib, the memory pointer to access the command buffer and process the graphic command.

11. A non-transitory computer-readable storage medium, containing a set of instructions which, when executed by a processor, cause the processor to virtualize graphic processing services in a virtual machine environment, the method comprising:
maintaining, by a virtual machine monitor (VMM), a virtual machine (VM) based on a host operating system (OS) executing in the system, wherein the VM contains a virtualized graphics library (vGLib) configured to support a graphic command from an application executing in the VM, and the host OS contains a graphics library (GLib) configured to support the graphic command and utilize a graphics processing unit (GPU) in the system to process the graphic command;
upon receiving the graphic command from the application, allocating, by the vGLib, a virtual command buffer as a memory section in the VM to store the graphic command, without transmitting the command to the VMM; and
sharing, by the VMM, access to the virtual command buffer with the host OS, thereby allowing the host OS to retrieve the graphic command from the memory section and deliver the graphic command to the GLib for processing.

12. The non-transitory computer-readable storage medium of claim 11, the method further comprising:
upon a determination that the graphic command involves accessing a front buffer or a back buffer, ignoring, by the vGLib, allocating memory of the VM to the front buffer or the back buffer; and
allocating, by the GLib, a frame buffer object for the processing of the graphic command by the GLib.

13. The non-transitory computer-readable storage medium of claim 11, the method further comprising:
storing, by the vGLib, image data associated with the graphic command in the memory section; and processing, by the host OS, the graphic command utilizing the image data retrieved from the memory section.

14. The non-transitory computer-readable storage medium of claim 11, wherein creating the target device interface comprises:
storing, by the vGLib, a plurality of command buffers to the memory section, wherein each of the plurality of command buffers is associated with a corresponding priority value; and
processing, by the host OS, the plurality of command buffers retrieved from the memory section based on their corresponding priority values.

15. A method to virtualize graphic processing services in a virtual machine environment, the method comprising:
maintaining, by a virtual machine monitor (VMM), a virtual machine (VM) based on a host operating system (OS) executing in the system, wherein the VM contains a virtualized graphics library (vGLib) configured to support a graphic command from an application executing in the VM, and the host OS contains a graphics library (GLib) configured to support the graphic command and utilize a graphics processing unit (GPU) in the system to process the graphic command;
upon receiving the graphic command from the application, allocating, by the vGLib, a virtual command buffer as a memory section in the VM to store the graphic command, without transmitting the command to the VMM; and
sharing, by the VMM, access to the virtual command buffer with the host OS, thereby allowing the host OS to retrieve the graphic command from the memory section and deliver the graphic command to the GLib for processing.

16. The method of claim 15, further comprising:
upon a determination that the graphic command involves accessing a front buffer or a back buffer, ignoring, by the vGLib, allocating memory of the VM to the front buffer or the back buffer; and
allocating, by the GLib, a frame buffer object for the processing of the graphic command by the GLib.

17. The method of claim 16, further comprising:
storing, by the vGLib, image data associated with the graphic command in the memory section; and processing, by the host OS, the graphic command utilizing the image data retrieved from the memory section.

18. The method of claim 15, wherein creating the target device interface comprises:
storing, by the vGLib, a plurality of command buffers to the memory section, wherein each of the plurality of command buffers is associated with a corresponding priority value; and
processing, by the host OS, the plurality of command buffers retrieved from the memory section based on their corresponding priority values.

* * * * *